(12) United States Patent
Katz et al.

(10) Patent No.: US 7,481,988 B2
(45) Date of Patent: Jan. 27, 2009

(54) METHOD FOR OBTAINING A HIGH PRESSURE ACID GAS STREAM BY REMOVAL OF THE ACID GASES FROM A FLUID STREAM

(75) Inventors: Torsten Katz, Lantau Island (HK); Norbert Asprion, Mannheim (DE)

(73) Assignee: BASF SE, Ludwigshafen (DE)

( * ) Notice: Subject to any disclaimer, the term of this patent is extended or adjusted under 35 U.S.C. 154(b) by 332 days.

(21) Appl. No.: 10/595,749

(22) PCT Filed: Nov. 5, 2004

(86) PCT No.: PCT/EP2004/012512

§ 371 (c)(1),
(2), (4) Date: May 9, 2006

(87) PCT Pub. No.: WO2005/044955

PCT Pub. Date: May 19, 2005

(65) Prior Publication Data

US 2007/0077188 A1 Apr. 5, 2007

(30) Foreign Application Priority Data

Nov. 10, 2003 (DE) ................ 103 52 878
Jun. 25, 2004 (DE) .......... 10 2004 031 051
Oct. 18, 2004 (DE) .......... 10 2004 050 936

(51) Int. Cl.
*B01D 53/48* (2006.01)
*B01D 53/50* (2006.01)
*B01D 53/52* (2006.01)
*B01D 53/54* (2006.01)
*B01D 53/62* (2006.01)

(52) U.S. Cl. ............... 423/220; 423/226; 423/228; 423/229; 423/236; 423/242.2; 423/242.7

(58) Field of Classification Search .......... 423/220, 423/226, 228, 229, 236, 242.2, 242.7
See application file for complete search history.

(56) References Cited

U.S. PATENT DOCUMENTS 4,085,192 A 4/1978 Van Scoy (Continued)

FOREIGN PATENT DOCUMENTS

DE 101 39 453 2/2003

(Continued)

*Primary Examiner*—Timothy C Vanoy
(74) *Attorney, Agent, or Firm*—Connolly Bove Lodge & Hutz LLP

(57) ABSTRACT

A method for obtaining an acid gas stream having a pressure of from 3 to 30 bar by removal of acid gases from a fluid stream containing $H_2S$, the molar fraction of $H_2S$ based on the total amount of acid gases being at least 50 mol %, the method comprising bringing the fluid stream into intimate contact with a liquid absorption medium, thus producing a fluid stream substantially freed from acid gases and an acid-gas-loaded liquid absorption medium; separating the fluid stream and the liquid absorption medium; separating, by heating and optionally by expansion or stripping, the liquid absorption medium into an acid gas stream and a regenerated liquid absorption medium; passing the regenerated liquid absorption medium into a heat exchanger and cooling it there by using part of its thermal energy to heat up the acid-gas-loaded liquid absorption medium; and recirculating the regenerated liquid absorption medium.

20 Claims, 2 Drawing Sheets

U.S. PATENT DOCUMENTS

| | | |
|---|---|---|
| 4,336,233 A | 6/1982 | Appl et al. |
| 4,498,911 A | 2/1985 | Deal et al. |
| 4,537,753 A | 8/1985 | Wagner et al. |
| 4,553,984 A | 11/1985 | Volkamer et al. |
| 4,853,012 A | 8/1989 | Batteux et al. |
| 5,562,891 A * | 10/1996 | Spencer et al. ............ 423/437.1 |
| 5,853,680 A | 12/1998 | Iijima et al. |
| 6,939,393 B2 | 9/2005 | Asprion et al. |
| 2006/0162559 A1 | 7/2006 | Asprion et al. |

FOREIGN PATENT DOCUMENTS

| | | |
|---|---|---|
| DE | 102 10 729 | 10/2003 |
| DE | 103 06 254 | 8/2004 |
| EP | 0 768 365 | 4/1997 |
| EP | 1 303 345 | 4/2004 |
| WO | WO-03/092862 | 11/2003 |
| WO | WO-2004/071624 | 8/2004 |
| WO | WO-2004/082809 | 9/2004 |
| WO | WO-2004/085036 | 10/2004 |

* cited by examiner

METHOD FOR OBTAINING A HIGH PRESSURE ACID GAS STREAM BY REMOVAL OF THE ACID GASES FROM A FLUID STREAM

CROSS REFERENCE TO RELATED APPLICATIONS

This application is a National Stage entry under 35 U.S.C. § 371 of PCT/EP2004/012512 filed on Nov. 5, 2004. International application PCT/EP2004/012512 claims priority to German applications 10352878.4 filed on Nov. 10, 2003 and 102004031051.3 filed on Jun. 25, 2004 and 102004050936.0 filed on Oct. 18, 2004, the entire of contents of each of the above applications are incorporated by reference herein.

The present invention relates to a method for obtaining a high-pressure acid gas stream by removal of the acid gases from a liquid stream.

In numerous processes in the chemical industry, fluid streams occur which comprise, as impurities, acid gases, for example $CO_2$, $H_2S$, $SO_2$, $CS_2$, HCN, COS or mercaptans. These fluid streams can be, for example, gas streams, such as natural gas, refinery gas or reaction gases which are produced in the oxidation of organic materials, for example organic wastes, coal or petroleum or in the composting of waste materials comprising organic substances.

The removal of the acid gases is of particular importance for varying reasons. For example, the sulfur compound content of natural gas must be reduced directly at the natural gas source by suitable treatment measures, since the sulfur compounds also form corrosive acids in the water frequently entrained by the natural gas. For transporting the natural gas in a pipeline, therefore, preset limiting values of the sulfur-containing impurities must be met. The reaction gases produced in the oxidation of organic materials, for example organic wastes, coal or petroleum, or in the composting of waste materials comprising organic substances must be removed in order to prevent the emission of gases which can damage the natural environment or affect the climate.

There is also extensive patent literature on the scrubbing solutions used in gas scrubbing processes. In principle a distinction can be made between two different types of absorption media or solvents for gas scrubbing:

Firstly, what are termed physical solvents are used, in which, after absorption has been completed, the dissolved acid gases are present in molecular form. Typical physical solvents are cyclotetramethylene sulfone (sulfolane) and derivatives thereof, aliphatic acid amides (acetylmorpholine, N-formylmorpholine), NMP (N-methylpyrrolidone), propylene carbonate, N-alkylated pyrrolidones and corresponding piperidones, methanol and mixtures of dialkyl ethers of polyethylene glycols (Selexol®, Union Carbide, Danbury, Conn., USA).

Secondly, chemical solvents are used, the mode of action of which is based on chemical reactions in which, after absorption has been completed, the dissolved acid gases are present in the form of chemical compounds. For example, in the case of the aqueous solutions of inorganic bases (for example potash solution in the Benfield process) or organic bases (for example alkanolamines) which are the most frequently used as chemical solvents on an industrial scale, ions are formed when acid gases are dissolved.

The solvent can be regenerated by membrane processes, heating, expansion to a lower pressure or stripping, the ionic species back-reacting to form acid gases and/or being stripped off by steam. After the regeneration process, the solvent can be reused.

Occasionally it is undesirable simply to pass the removed acid gases to the atmosphere, but they are utilized or disposed of in other ways. This is the case, for example, with enhanced oil recovery. Here the compressed acid gas, by being forced into petroleum deposits, is utilized to increase the amount of petroleum recoverable from the field technically. Even if the acid gas is not utilized for enhanced yield from petroleum deposits, it can be expedient, for reasons of climate protection, to force the acid gas into underground seams or to dissolve it in deep water layers in open bodies of water.

For this type of further use or disposal it is necessary that the acid gases have a pressure level which is above atmospheric pressure.

EP-A-768365 and U.S. Pat. No. 5,853,680 disclose separating, from a natural gas having a pressure of 30 bar or more and which comprises $CO_2$ as acid gas, the $CO_2$ in such a manner that the $CO_2$ is then present at a pressure level of 10 bar. For this the natural gas requiring treatment is brought into contact with an absorption liquid, for example organic amines such as methyldiethanolamine. A process for removing the $CO_2$ from natural gas in which the $CO_2$ is then left at a relatively high pressure level operates less expediently in energy terms than a process in which the $CO_2$ is expanded at atmospheric pressure. The reason for this is that the $CO_2$-loaded absorption liquid is regenerated, that is to say the $CO_2$ is expelled, generally in such a manner that the absorption liquid is expanded and simultaneously or subsequently heated. The lower, then, the pressure level during the expansion of the loaded absorption liquid that can be selected, the less heat energy must then be employed in the subsequent heating to obtain a regenerated absorption liquid having a defined residual content of $CO_2$.

Against this background, a person skilled in the art who has the task of providing an acid gas at a high pressure level which is produced by regenerating an acid-gas-loaded absorption liquid is faced by two alternatives. In the first alternative, a person skilled in the art proceeds as described in the two abovementioned patents. In the case of the second alternative, the person skilled in the art expands the acid-gas-loaded absorption liquid to atmospheric pressure and then increases the pressure level of the required amount of acid gas by means of customary methods, for example by a compressor. Which of these two alternatives is the more expedient from energetic aspects depends on many boundary conditions. In the case of the first alternative, a person skilled in the art, for the reasons described above, must additionally employ energy during the regeneration of the absorption liquid. In the case of the second alternative, although less energy is required for regenerating the absorption liquid, additional energy must be employed to drive the compressors.

It is an object of the present invention to provide an economic process in which it is possible to free fluid streams from the $H_2S$-containing acid gases present therein as impurities and to provide the acid streams at a high pressure level.

We have found that this object is achieved by a process for producing an acid gas stream having a pressure of from 3 to 30 bar by removing the acid gases from a fluid stream comprising as impurities $H_2S$ and if appropriate other acid gases, the molar fraction of $H_2S$, based on the total amount of acid gases, being at least 50 mol %, which comprises a) in at least one absorption step, bringing the fluid stream into intimate contact with a liquid absorption medium and thus producing a fluid stream substantially freed from acid gases and an acid-gas-loaded liquid absorption medium (step a), b) separating from one another the fluid stream substantially freed from acid gases and the acid-gas-loaded liquid absorption medium (step b), c) separating, by heating and if appropriate expansion or stripping, the acid-gas-loaded liquid absorption medium into an acid gas stream having a pressure of from 3 to 30 bar and a regenerated liquid absorption medium (step c), d) passing the regenerated liquid absorption medium into a heat exchanger and cooling it there, by using a part of its thermal energy to heat up the acid-gas-loaded liquid absorption medium in step (c) (step d), e) recirculating the regenerated liquid absorption medium to step a) (step e).

The inventive absorption medium or the inventive process is suitable for removing acid gases from fluid streams which comprise at least 50 mol %, preferably at least 75 mol %, of $H_2S$, based on the total amount of acid gases in the fluid stream. The other acid gases are, in particular, $CO_2$, COS, mercaptans, $SO_3$, $SO_2$, $CS_2$ and HCN. Particularly expediently, the $CO_2$ fraction of the other acid gases is at least 50 mol %.

Fluids which comprise the acid gases comprise, in addition to the acid gases, inert constituents, that is to say those inert gas and liquid constituents which are not absorbed, or are not absorbed to a significant extent, by the absorption medium. The fluids are, on the one hand, gases, such as natural gas, synthesis gas, coke oven gas, coal-gasification gas, circulation gas and combustion gases and on the other hand, liquids which are essentially immiscible with the absorption liquid, such as LPG (liquefied petroleum gas) or NGL (natural gas liquids). Examples of inert constituents are readily volatile hydrocarbons, preferably $C_1$ to $C_4$ hydrocarbons, for example methane, and also nitrogen and hydrogen.

The fluid stream requiring treatment is generally at a pressure of from 1 to 200 bar, preferably from 3 to 150 bar, particularly preferably from 10 to 100 bar.

Suitable absorption media are virtually all customary absorption media.

Preferred absorption media are, for example, chemical solvents selected from the group consisting of solutions consisting principally of aliphatic or cycloaliphatic amines having from 2 to 12 carbon atoms, alkanolamines having from 2 to 12 carbon atoms, cyclic amines where 1 or 2 nitrogen atoms, together with 1 or 2 alkanediyl groups, form 5-, 6- or 7-membered rings, mixtures of the abovementioned solutions, aqueous solutions of the abovementioned mixtures and solutions, aqueous solutions comprising salts of amino acids aqueous potash solutions which may if appropriate comprise piperazine or methylethanolamine aqueous NaOH solution or milk of lime.

Particularly preferably, as chemical solvents, use is made of solutions consisting principally of 3-dimethylamino-1-propanol (DIMAP), N,N,N',N'-tetramethyl-1,3-propane-diamine (TMPDA), monoethanolamine (MEA), diethanolamine (DEA), triethanolamine (TEA), diethylethanolamine (DEEA), diisopropylamine (DIPA), aminoethoxyethanol (AEE) and methyldiethanolamine (MDEA), mixtures of the abovementioned solutions and aqueous solutions of the abovementioned mixtures and solutions.

The absorption medium described in U.S. Pat. No. 4,336,233 is very particularly proven. This is an aqueous solution of methyldiethanolamine (MDEA) and piperazine as absorption accelerator or activator. The wash liquid described there comprises from 1.5 to 4.5 mol/l of methyldiethanolamine (MDEA) and from 0.05 to 0.8 mol/l, preferably up to 0.4 mol/l of piperazine.

Regarding further preferred chemical absorption media, reference is made to DE-A-10306254, DE-A-10210729, DE-A-10139453 and EP-A-1303345.

Absorption media which have been proven practice are, in addition, physical solvents selected from the group consisting of cyclotetramethylene sulfone (sulfolane) and derivatives thereof, aliphatic acid amides (acetylmorpholine, N-formylmorpholine), NMP (N-methylpyrrolidone), propylene carbonate, N-alkylated pyrrolidones and corresponding piperidones, methanol and mixtures of dialkyl ethers of polyethylene glycols.

The exit gas which is rich in acid gas constituents (crude gas) is, in an absorption step in an absorber, brought into contact with the inventive absorption medium, as a result of which the acid gas constituents are at least in part washed out.

Apparatuses which act as absorbers are, preferably, a scrubbing apparatus used in customary gas scrubbing processes. Suitable scrubbing apparatuses are, for example, columns having random and structured packing and tray columns, radial-stream scrubbers, jet scrubbers, Venturi scrubbers and rotary spray scrubbers, preferably columns having random and structured packing and tray columns, particularly preferably columns and random-packing columns. The fluid stream is treated with the absorption medium here preferably in a column in countercurrent flow. The fluid here is generally fed into the lower region, and the absorption medium into the upper region, of the column.

The inventive process can comprise one or more, in particular two, sequential absorption steps. The absorption can be carried out in a plurality of sequential substeps, the crude gas comprising the acid gas constituents being brought into contact, in each of the substeps, with in each case one substream of the absorption medium.

According to a preferred embodiment, the inventive process is carried out in such a manner that the fluid comprising the acid gases is treated in an absorption step with the liquid absorption medium at a temperature of from 30 to 100° C., preferably from 40 to 90° C., and in particular from 50 to 80° C. The total pressure in the absorption step is preferably from 3 to 150 bar, particularly preferably from 10 to 100 bar, generally from 1 to 200 bar.

The acid gas constituents can be released from the acid-gas-constituent-loaded absorption medium in a regeneration step in a customary manner (in a similar manner to the publications cited hereinafter), a regenerated absorption medium being obtained. In the regeneration step, the loading of the absorption medium is decreased and the resultant regenerated absorption medium is preferably then recirculated to the absorption step.

Preferably, the regeneration step, step (c) further comprises, before the heating, an upstream pressure expansion of the loaded absorption medium from a high pressure, as prevails when the absorption step is being carried out, to a lower pressure. The pressure expansion can be performed, for example, by means of a throttle valve and/or an expansion turbine. Regeneration with an expansion stage is described, for example, in the publications U.S. Pat. Nos. 4,537,753 and 4,553,984.

If in this pressure expansion, the liquid absorption medium is expanded to a pressure which is lower than the desired pressure of the acid gas separated off in accordance with step (c), the pressure of the liquid absorbing medium is then, that is to say still before the heating, correspondingly increased, preferably by means of a pump.

The increase in pressure of the loaded liquid absorption medium to at least the pressure which the acid gas is to have in step (c) is obviously also required if no upstream pressure expansion is performed and the pressure at which the absorption (step (a)) is performed is lower than the pressure to which the acid gas is brought in step (c).

The acid gas constituents are released in the regeneration step carried out by heating, generally in a column, for example in an expansion column, for example a vertical or horizontal flash vessel, or a countercurrent flow column equipped with internals. A plurality of expansion columns can be connected in series, in which regeneration is performed at varying pressures. For example, regeneration can be performed in a preliminary expansion column at high pressure which is typically approximately 1.5 bar above the partial pressure of the acid constituents in the absorption step, and in a main expansion column at a pressure of from 3 to 30 bar. The lower limit of the preferred pressure range is 5 bar. The upper limit of the preferred pressure range is preferably 20, particularly preferably 10, bar.

In the regeneration step, the loaded liquid absorption medium is heated in two ways. Firstly external heat energy is supplied to it. Secondly it is heated by heat exchange with the regenerated liquid absorption medium produced in the regeneration step.

The external heat can be fed, for example, in such a manner that, in the column, in which the heating and if appropriate in addition the expansion or the stripping is performed, the regenerated liquid absorption medium which collects in the column bottom is boiled. This is preferably achieved by taking off from the column bottom a stream of the regenerated liquid absorption medium, passing it into a reboiler and from there passing it back to the column bottom.

The regeneration can be additionally reinforced by expansion or stripping.

DETAILED DESCRIPTION OF THE PREFERRED EMBODIMENTS

The inventive process will now be explained hereinafter with reference to FIG. 1.

Figure 1:
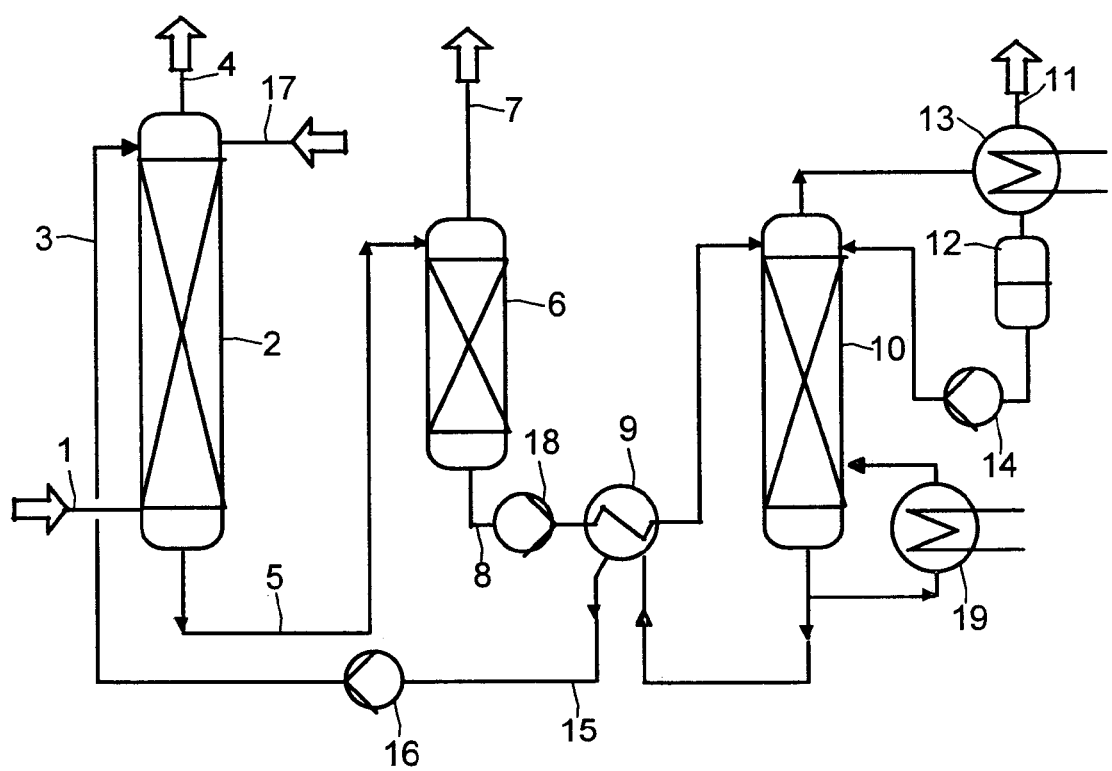
FIG. 1 shows diagrammatically an apparatus according to a preferred embodiment.

FIG. 1 shows diagrammatically an apparatus in which the absorption stage is carried out in a single stage and the expansion stage is carried out in two stages. The starting gas (hereinafter also termed feed gas) is fed into the lower region of the absorber 2 via line 1. The absorber 2 is a column which is packed with random packings to effect the mass transfer and heat exchange. Alternatively, the column can also be designed as bubble-cap tray, valve tray or sieve-tray column. The absorption medium which is a regenerated absorption medium having a small residual content of acid gases, is applied via the line 3 to the top of the absorber 2 in countercurrent flow to the feed gas. The acid-gas-depleted gas leaves the absorber 2 overhead (line 4). The acid-gas-enriched absorption medium leaves the absorber 2 at the bottom via line 5 and is introduced into the upper region of the high-pressure expansion column 6 which is generally operated at a pressure which is above the partial pressure of the acid gases of the feed gas fed to the absorber. The loaded liquid absorption medium is generally expanded using a customary apparatus, for example a level control valve, a hydraulic turbine or a pump running in reverse. During the expansion, the majority of the dissolved non-acid gases and a small part of the acid gases are released. These gases are ejected from the high-pressure expansion column 6 overhead via line 7.

The absorption medium, which is still loaded with the majority of the acid gases, leaves the high-pressure expansion column via line 8 and is compressed as required to a higher pressure using the pump 18 and is then heated in the heat exchanger 9. By means of the heat input, a large part of the acid gases can be released. The heated absorption medium is introduced into the upper region of an expansion column 10 which is equipped with a packing of random packings to achieve a high surface area and thus to effect the release of the acid gas and to establish equilibrium. Alternatively, the column can also be constructed as a bubble-cap, valve-tray or sieve-tray column. The expansion column 10 is operated at pressures from 3 to 30 bar. As soon as entry into the expansion column 10, a large part of the dissolved acid gases is released. Further acid gas is virtually completely released by stripping in the column. The absorption medium is regenerated in this manner. At the top of the expansion column 10 there is provided a reflux condenser 11 together with a collection vessel 12 to cool the released acid gases and condense a portion of the vapor. The majority of the acid gas leaves the reflux condenser 11 via line 13. The condensate is pumped back to the top of the expansion column 10 by means of pump 14. The regenerated absorption medium, which comprises only a small part of the acid gas, leaves the expansion column 10 at the bottom via line 15 and, for heat recovery, is applied to heat exchanger 9 and is then applied to the top of the absorber 2 via line 3 by means of pump 16. To effect the heat input into expansion column 10, a portion of the regenerated absorption medium is taken off from line 15 upstream of the heat exchanger 9 and passed into a reboiler. The regenerated absorption medium heated there is then recirculated to the internal part of the expansion column 10.

In this process, the heat recovery is of particular importance, since, owing to the fact that the operating pressure in the stripper is increased compared with the prior art, higher bottom outlet temperatures are established than is usually the case. The energy which is recoverable in the heat exchanger 9 is also correspondingly greater. Via line 17, fresh water can be fed in to make up for the water discharged with the gases.

The acid gas streams recovered in this manner, in the event that they were separated off from petroleum or from a natural gas originating from a crude oil deposit, can be used by passing the acid gas back into the crude oil deposit. This increases the yield of the crude oil deposit.

In the event that the acid gases were recovered by separating off combustion gas, the acid gas, for reasons of climate protection, can be passed into subterranean seams or into deep water layers in open bodies of water to be dissolved.

Experimental Section

EXAMPLE 1

Figure 2:
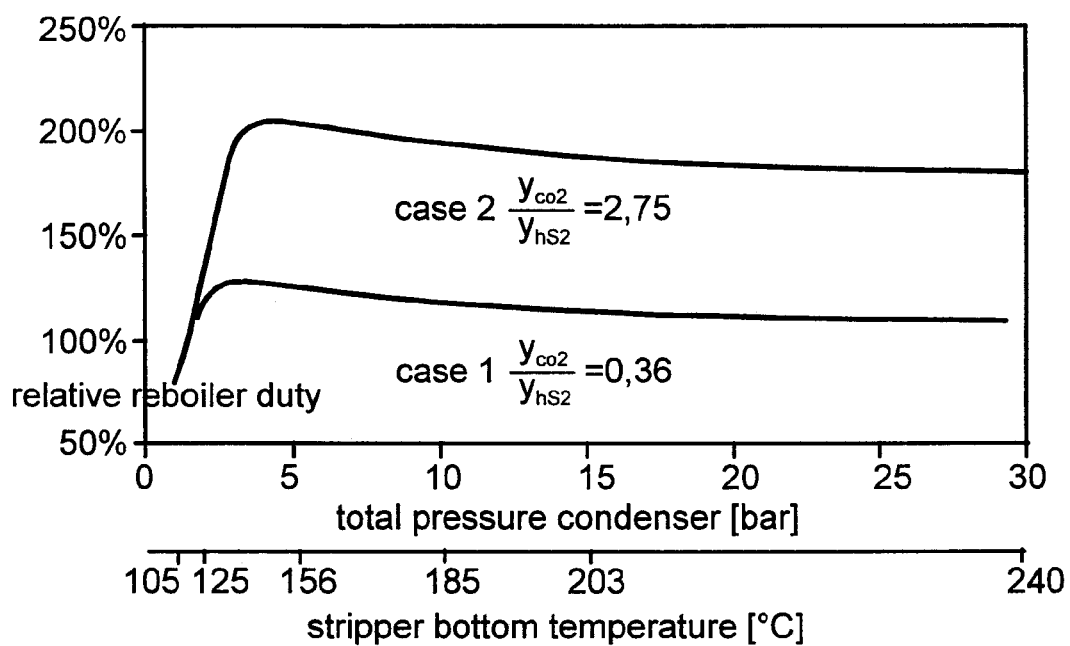
FIG. 2 shows the relative reboiler duty needed to reduce the acid-gas-loaded absorption medium against the pressure set at the top of the expansion column for acid-gas streams having two different $CO_2$ to $H_2S$ concentrations.

A model calculation was carried out for the inventive treatment of a gas stream in a plant according to FIG. 1. The most important process parameters and the composition of the feed gas can be taken from Table 1. The liquid absorbent used was an aqueous solution comprising methyldiethanolamine and piperazine. The result of the calculation is shown in FIG. 2. There, the required power of the reboiler 19 (relative reboiler duty) needed to reduce the acid-gas-loaded absorption medium to a defined value is plotted against the pressure which is set at the top of the expansion column 10 (total pressure condenser) and the resultant temperature in the bottom of the expansion column 10 (stripper bottom temperature). The model calculation shows that, for pressure ranges from 3 bar in the context of the process, no additional energy need be expended to provide acid gases at a high pressure level. Here the process differs fundamentally from the known processes in which the expansion is performed to a low pressure level and the pressure elevation is then performed by compression.

TABLE 1

| Feed gas rate [kmol/h] | 1194 |
|---|---|
| Feed gas composition | |
| $H_2O$ [%] | 0.005 |
| $CO_2$ [%] | 4.890 |
| $H_2S$ [%] | 13.529 |
| $C_2H_6$ [%] | 4.420 |
| $C_3H_8$ [%] | 3.710 |
| $N_2$ [%] | 2.540 |
| $CH_4$ [%] | 70.907 |
| T Feed gas [° C.] | 29 |
| p Feed gas [bara] | 60.71 |

EXAMPLE 2 (for Comparison)

The above-described model calculation was repeated, all parameters being chosen so as to be identical except for the ratio of $CO_2$ concentration to $H_2S$ concentration; here this ratio was 2.75.

It can be seen that here the reboiler power remains at a high level at pressures of 10 bar and more.

We claim:

1. A method for obtaining an acid gas stream having a pressure of from 3 to 30 bar by removal of the acid gases from a fluid stream comprising as impurities $H_2S$ and optionally other acid gases, the molar fraction of $H_2S$, based on the total amount of acid gases, being at least 50 mol %, which comprises
    a) in at least one absorption step, bringing the fluid stream into intimate contact with a liquid absorption medium and thus producing a fluid stream substantially freed from acid gases and an acid-gas-loaded liquid absorption medium (step a),
    b) separating from one another the fluid stream substantially freed from acid gases and the acid-gas-loaded liquid absorption medium (step b),
    c) separating, by heating and optionally expansion or stripping, the acid-gas-loaded liquid absorption medium into an acid gas stream having a pressure of from 3 to 30 bar and a regenerated liquid absorption medium (step c)
    d) passing the regenerated liquid absorption medium into a heat exchanger and cooling it there, by using a part of its thermal energy to heat up the acid-gas-loaded liquid absorption medium in step (c) (step d)
    e) recirculating the regenerated liquid absorption medium to step a) (step e).

2. The method according to claim 1, wherein the acid gas stream to be obtained is at a pressure of from 5 to 30 bar.

3. The process according to claim 1, wherein, as liquid absorption medium, use is made of a chemical solvent selected from the group consisting of
    solutions comprising aliphatic or cycloaliphatic amines having from 2 to 12 carbon atoms, alkanolamines having from 2 to 12 carbon atoms, cyclic amines where 1 or 2 nitrogen atoms, together with 1 or 2 alkanediyl groups, form 5-, 6- or 7-membered rings, mixtures of the above-mentioned solutions, aqueous solutions of the above-mentioned mixtures and solutions,
    aqueous solutions comprising salts of amino acids
    aqueous potash solutions which optionally comprise piperazine or monoethanolamine (MEA)
    aqueous NaOH solution or milk of lime.

4. The process according to claim 1, wherein, as absorption medium, use is made of a physical solvent selected from the group consisting of cyclotetramethylene sulfone (sulfolane) and derivatives thereof, aliphatic acid amides, NMP (N-methylpyrrolidone), propylene carbonate, N-alkylated pyrrolidones and corresponding piperidones, methanol and mixtures of dialkyl ethers of polyethylene glycols.

5. The process according to claim 1, wherein, as scrubbing solution, use is made of an aqueous solution comprising methyldiethanolamine and piperazine.

6. The process according to claim 1, wherein, in step (a) a liquid absorption medium is used which comprises water and step (c) is carried out by passing the heated acid-gas-loaded liquid absorption medium to the top of a column and conducting it there to the bottom of the column in countercurrent flow to a steam stream in the column, and producing a steam stream by heating the regenerated liquid absorption medium formed there to the extent that the water present in the liquid absorption medium to be regenerated vaporizes in part.

7. The process according to claim 1, wherein, in step (d), in the heat exchanger the temperature difference between the exiting regenerated liquid absorption medium and the incoming loaded liquid absorption medium is from 5 to −100° K.

8. The process according to claim 1, wherein the temperature difference between the regenerated liquid absorption medium which is incoming in step (a) to the heat exchanger and the regenerated liquid absorption medium exiting from the heat exchanger is from 50 to 200° K.

9. The process according to claim 1, wherein the acid gases present in the fluid stream are a mixture which comprises, in addition to $H_2S$, other acid gases selected from a group consisting of $CO_2$, COS, mercaptans, $SO_3$, $SO_2$, $CS_2$ and HCN.

10. The process as claimed in claim 8, wherein the $CO_2$ fraction of the other acid gases is at least 50 mol %.

11. The process according to claim 1, wherein the acid gas stream is passed into underground seams, is dissolved in deep water layers of open bodies of water or is passed into crude oil deposits.

12. The process according to claim 2, wherein, as liquid absorption medium, use is made of a chemical solvent selected from the group consisting of
    solutions comprising aliphatic or cycloaliphatic amines having from 2 to 12 carbon atoms, alkanolamines having from 2 to 12 carbon atoms, cyclic amines where 1 or 2 nitrogen atoms, together with 1 or 2 alkanediyl groups, form 5-, 6- or 7-membered rings, mixtures of the above-mentioned solutions, aqueous solutions of the above-mentioned mixtures and solutions,
    aqueous solutions comprising salts of amino acids
    aqueous potash solutions which optionally comprise piperazine or monoethanolamine (MEA)
    aqueous NaOH solution or milk of lime.

13. The process according to claim 2, wherein, as absorption medium, use is made of a physical solvent selected from the group consisting of cyclotetramethylene sulfone (sulfolane) and derivatives thereof, aliphatic acid amides, NMP (N-methylpyrrolidone), propylene carbonate, N-alkylated pyrrolidones and corresponding piperidones, methanol and mixtures of dialkyl ethers of polyethylene glycols.

14. The process according to claim 3, wherein, as absorption medium, use is made of a physical solvent selected from the group consisting of cyclotetramethylene sulfone (sulfolane) and derivatives thereof, aliphatic acid amides, NMP (N-methylpyrrolidone), propylene carbonate, N-alkylated pyrrolidones and corresponding piperidones, methanol and mixtures of dialkyl ethers of polyethylene glycols.

15. The process according to claim 2, wherein, as scrubbing solution, use is made of an aqueous solution comprising methyldiethanolamine and piperazine.

16. The process according to claim 3, wherein, as scrubbing solution, use is made of an aqueous solution comprising methyldiethanolamine and piperazine.

17. The process according to claim 4, wherein, as scrubbing solution, use is made of an aqueous solution comprising methyldiethanolamine and piperazine.

18. The process according to claim 2, wherein, in step (a) a liquid absorption medium is used which comprises water and step (c) is carried out by passing the heated acid-gas-loaded liquid absorption medium to the top of a column and conducting it there to the bottom of the column in countercurrent flow to a steam stream in the column, and producing a steam stream by heating the regenerated liquid absorption medium formed there to the extent that the water present in the liquid absorption medium to be regenerated vaporizes in part.

19. The process according to claim 3, wherein, in step (a) a liquid absorption medium is used which comprises water and step (c) is carried out by passing the heated acid-gas-loaded liquid absorption medium to the top of a column and conducting it there to the bottom of the column in countercurrent flow to a steam stream in the column, and producing a steam stream by heating the regenerated liquid absorption medium formed there to the extent that the water present in the liquid absorption medium to be regenerated vaporizes in part.

20. The process according to claim 4, wherein, in step (a) a liquid absorption medium is used which comprises water and step (c) is carried out by passing the heated acid-gas-loaded liquid absorption medium to the top of a column and conducting it there to the bottom of the column in countercurrent flow to a steam stream in the column, and producing a steam stream by heating the regenerated liquid absorption medium formed there to the extent that the water present in the liquid absorption medium to be regenerated vaporizes in part.

* * * * *